Figure 1:
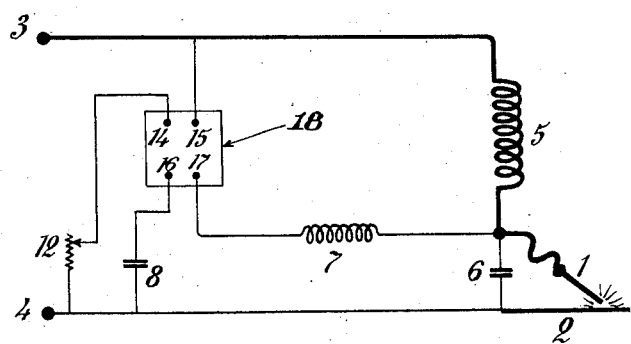

Sept. 29, 1925.   
J. BETHENOD  
1,555,547

METHOD AND MEANS FOR STRIKING AND SUSTAINING A LOW VOLTAGE ARC

Filed Nov. 27, 1923

Inventor
J. Bethenod
By Marks & Clerk Attys

Patented Sept. 29, 1925.

1,555,547

UNITED STATES PATENT OFFICE.

JOSEPH BETHENOD, OF PARIS, FRANCE.

METHOD AND MEANS FOR STRIKING AND SUSTAINING A LOW-VOLTAGE ARC.

Application filed November 27, 1923. Serial No. 677,324.

*To all whom it may concern:*

Be it known that I, JOSEPH BETHENOD, citizen of the Republic of France, residing at 15 Rue Michel-Ange, Paris, XVI<sup>e</sup>, in the Republic of France, have invented certain new and useful Methods and Means for Striking and Sustaining a Low-Voltage Arc, of which the following is a specification.

It is already well known in electric welding and like work (arc metal cutting etc.) to use a low tension electric arc fed by means of either a direct current or alternating current source. In order to obtain satisfactory results, it is necessary that such arc lights up easily and, once lighted, keeps burning on, even if its length is appreciably varied as much as is needed owing to the work to be done. With direct current there are commonly used, as well known, generators of a special type delivering a relatively high no-load voltage, but the short circuit current of which cannot however much exceed the normal current; such generators are costly and bulky.

When alternating current is used the problem is yet much more difficult to solve, on account of the fact that a low tension arc between metal electrodes is difficult to keep burning. In order to obtain a sufficient no-load voltage, without the short circuit current rising to an excessive value, a suitable impedance is generally connected in between the arc and the mains. This, however implies important supplementary losses or gives rise to a very small power factor. In brief the working is never quite good, and, in most cases, the use of direct current is preferred, by generating it locally, if needed, by means of a motor-generator unit.

The object of my present invention is a method and means, by which alternating current may be used at a very low tension (40 volts, for instance) for electric arc welding or similar applications. It is to be noted, however, that my method may equally well be applied in the case use is made of a direct current, and gives then, as one of its advantages, the possibility of using, as a current source, small storage batteries, such as are commonly used on motor-cars for various duties (lighting, ignition, starting). The setting up of portative welding outfits is then, owing to my invention, quite simple and the fact that such outfits may be used anywhere (for instance for immediate repair, on the spot, of damaged motor-car parts) would make considerably easier numerous repair or other operations.

The basic principle of my method is to superimpose on the welding arc discharge a tiny spark produced by means of a high frequency current with a sufficiently high tension (for instance of the order of a few thousand volts). Such spark provokes the ignition of the arc without it being necessary to bring the electrodes into contact, and moreover the sparks maintain a sufficient ionization between the said electrodes to easily keep the arc burning even if the feeding source is an alternating current one. It has already been proposed to produce such a voltaic arc between electrodes not in contact, but the methods which were used do not seem to have given till now any satisfactory results, principally as regards the application to which my invention is directed. The method which is the object of my present invention gives, on the contrary, excellent results, as has been shown by experience. This method consists, in its principle, in connecting across the arc terminals a condenser which is included in an oscillating circuit fed by means of a high frequency current source of any type. Between the electrodes is thus produced a high tension which gives rise to the spark used to start and maintain the arc. As this condenser has a relatively very small capacity it does not take any noticeable supplementary output current from the arc feeding source, which last is protected from the high frequency current by the ordinary means of choking coils. Moreover, it is to be noted that the power dissipated in the whole of the high frequency circuits is relatively quite small in comparison with the power delivered to the arc.

Figure 1 shows a preferred form of my invention as applied to the feeding of an arc, between electrodes 1 and 2, by means of a low tension current source not shown, the output circuit of which should be connected across terminals 3 and 4. According to a known disposition a self inductance choking coil 5 is inserted into the circuit. According to my invention, I apply across the arc terminals a high frequency electromotive force, which in the example shown, is supplied by means of an oscillatory circuit comprising a condenser 6 across the arc terminals, a self-induction coil 7 and another condenser 8. This circuit is excited by means of a high frequency generator 18, the output terminals of which are diagrammatically shown at 16, 17 and the input terminals of which are diagrammatically shown at 14 and 15, as connected through some regulating means 12 (variable resistance or impedance) with the low voltage mains 3—4. By tuning circuit 6, 7, 8, on the frequency of generator 18, one may obtain, as is well known, a tension as high as is wanted, across the terminals of condenser 6, that is to say across the arc, which can thus, in any case, be ignited and kept burning. It must be understood that, in such tuning, the capacity of electrodes 1 and 2 to each other must be taken into account.

Another object of condensers 6 and 8 is to avoid short circuiting the low frequency mains, self induction coil 5 avoiding any high frequency current from passing into the said mains.

Figure 2:
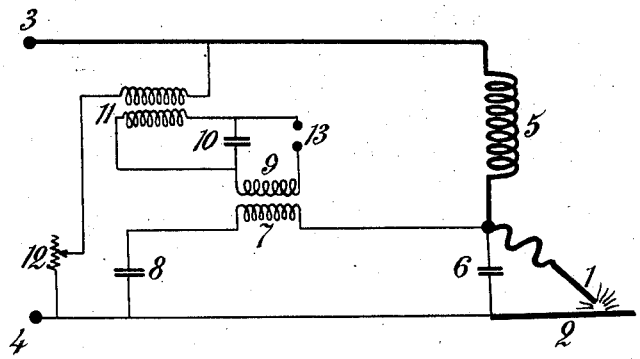

A second form of my invention is shown on Figure 2 in which the same letters are employed to designate the same parts as in Figure 1 and in which the high frequency generator shown at 18 on Figure 1 is represented in the known form of an oscillatory circuit with spark gap 13, capacity 10 and self-induction 9, inductively coupled to self-induction 7 of the above described oscillatory circuit 6, 7, 8. Condenser 10 is charged by means of a transformer 11, the primary winding of which is fed by means of a source, not shown, connected across mains 3, 4, through the formerly mentioned regulating means 12.

The oscillating circuits may be made according to any disposition already known for wireless telegraph or telephony; they may be coupled either electromagnetically by induction, as shown on the drawing, or by derivation, or electrostatically, etc. Transformer 11 may be fed by means of any source independently from the one connected across terminals 3—4.

In the case where direct current means are used oscillating circuit 6, 7, 8, may be excited by means of an induction coil with vibrator, fed, for instance, from the said direct current mains.

In any case, the high frequency current source could be in the form of a high frequency alternator, a vacuum tube, an arc of the Poulsen type, etc. or of any other source generall known for high frequency currents, the said source replacing parts 9, 10, 11, 12, 13, of the Figure 1. These parts falling off, the high frequency source may be introduced into circuit 6, 7, 8, with or without the use of a transformer. However, in each of the above described dispositions, the use of condenser 6 remains essential.

It is to be noted, at last, that the high frequency current is, as well known, without any physiological effect on the operator, although a high tension will be produced on the charging of condenser 6 by such current.

Having thus described my invention, what I claim as new and desire to secure by Letters-Patent is:

1. The method of striking and sustaining a low voltage arc, which consists in connecting a condenser directly across the arc point, and in charging periodically said condenser by means of an auxiliary source.

2. Electric arc apparatus comprising in combination a low tension current source, two electrodes connected thereto, a condenser directly connected across the said electrodes and an auxiliary source adapted to charge periodically said condenser.

3. Electric apparatus comprising in combination, a low tension current source, two electrodes connected thereto, a condenser directly connected across the said electrodes, said condenser being part of a closed oscillatory circuit, and a relatively high frequency current source adapted to feed said closed oscillatory circuit.

4. Electric arc apparatus comprising in combination a low tension current source, two electrodes connected thereto, a condenser directly connected across said electrodes, said condenser being part of a closed oscillatory circuit comprising also an inductance and another condenser and a relatively high frequency current source adapted to energize said closed oscillatory circuit.

5. Electric arc apparatus comprising in combination a low tension current source, two electrodes connected thereto, a condenser directly connected across said electrodes, said condenser being part of a closed oscillatory circuit comprising also an inductance and another condenser and a relatively high frequency current source adapted to energize said closed oscillatory circuit, said closed oscillatory circuit being tuned to the frequency of said relatively high frequency current source.

In testimony whereof I affix my signature.

JOSEPH BETHENOD.